March 21, 1967     J. W. MACPHERSON     3,310,193
BOTTLE CAP
Filed March 22, 1965

John W. Macpherson
INVENTOR.

BY *Eugene D. Farley*

*Atty.*

United States Patent Office 3,310,193
Patented Mar. 21, 1967

3,310,193
BOTTLE CAP
John W. Macpherson, 1107 S. K St.,
Tacoma, Wash. 98405
Filed Mar. 22, 1965, Ser. No. 441,528
1 Claim. (Cl. 215—56)

This invention pertains to a pressure-regulating bottle cap.

In the preparation of bottled, pressurized beverages, there are at least two situations in which it is essential to control the pressure developed in the bottle to within precise limits. Thus in the preparation of malted beverages such as home brew, the pressure developed within the bottle must be sufficient to insure that a flat, acid taste will not develop in the brew, but insufficient to burst the bottle. The commonplace method of solving this problem is to brew the beverage in a crock for a certain period of time, thereafter transferring the brew to bottles where the fermentation process is completed.

As is well known, this procedure is difficult to control. If the brew is bottled too soon, the bottles burst; if too late, the beverage is flat and sour. Since the optimum moment of bottling is determined by several factors in addition to the brewing time, it is difficult, if not impossible, for the amateur reproducibly to prepare home brew of optimum quality.

Similarly, in the manufacture of pressurized bottled fruit juices, it is essential that the pressure be controlled carefully within limits to prevent bursting of the bottles and to develop optimum quality of the beverage. For example, in the production of fermented beverages such as hard cider, it theoretically would be possible to vacuum pack the fruit juice, preserving it indefinitely. Then when it is desired to ferment the juice, the vacuum seal could be broken, air admitted, the fermenting organism introduced, and the juice fermented in a closed bottle. Here again the pressure developed within the bottle during fermentation must be so controlled that pressure will develop sufficient to produce a beverage of optimum flavor, but insufficient to burst the bottle in which the fermentation occurs.

It is toward a solution of the foregoing problem that the present invention is directed.

Generally stated, the present invention comprises a pressure regulating bottle cap adapted to be secured to the top of a bottle in which fermentation is to occur. The cap has a top having a central aperture therethrough, and means for securing the cap to the bottle.

A resilient diaphragm is seated in the cap against the inner surface of its top. The diaphragm has a central perforation communicating with the aperture.

When a fermenting beverage is confined in the bottle, the gas pressure developed distends the central portion of the diaphragm through the aperture, forming a bubble projecting outwardly from the cap. The aperture and perforation are so proportioned relative to each other that the perforation is substantially closed to the passage of gas until the gas pressure has developed sufficiently to distend the bubble to the point of equalizing the internal tension of the perforation.

Thereupon the perforation in the diaphragm opens, releasing gas to the atmosphere and preventing bursting of the bottle. However, since a substantial pressure is required to distend the bubble through the aperture and to open the perforation in the diaphragm, a level of pressure is maintained in the bottle sufficient for the brewing purpose. Furthermore, this level of pressure is determined reproduceably with a high degree of accuracy by control of the relative sizes of the aperture and perforation, as well as of the thickness and composition of the diaphragm, thereby achieving the general object of the invention.

Considering the foregoing in greater detail and with particular reference to the drawings, wherein.

Figure 1:
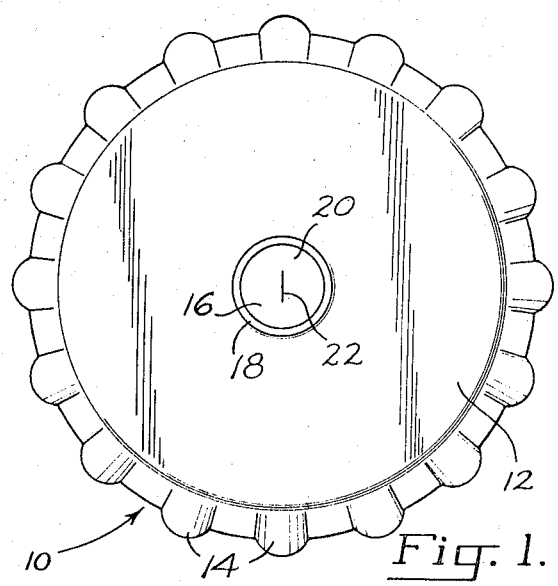
FIG. 1 is a top plan view of the pressure regulating bottle cap of the invention in one of its embodiments.
Figure 2:
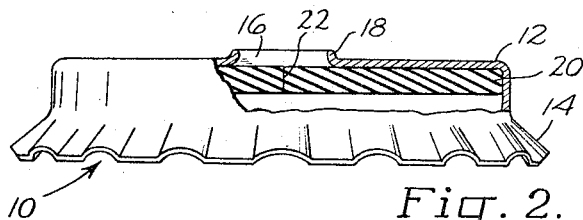
FIGS. 2 and 3 are views in side elevation, partly in section, of the bottle cap of FIG. 1 illustrating the manner in which gas is vented through the cap.
Figure 3:
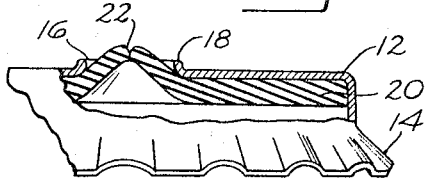

Considering the form of the invention illustrated in FIGS. 1, 2 and 3.

In this form of the invention the cap 10 comprises a crown cap having a top 12 and a dependent fluted skirt 14 adapted to be crimped about the neck of a bottle in the usual manner. An aperture 16 is present in the central portion of the cap, being defined by an outwardly projecting rim 18.

Seated within cap 10 is a resilient, distendable diaphragm 20 made preferably from natural rubber or a synthetic rubber such as Neoprene. Diaphragm 20 serves as a gasket seal against cap 10. It also serves a pressure controlling function. To this end a perforation 22 is present through the central portion of the diaphragm. It communicates with aperture 16 through the cap top.

The perforation may be formed by puncturing the diaphragm with a sharp tool. It may be variously shaped, as a round opening, a slit, or a triangular hole, but in any event is relatively restricted in its cross sectional area as compared with the cross sectional area of aperture 16.

The lateral forces developed by the internal tension of the resilient diaphragm normally maintain perforation 22 closed against the gas pressure developed in the bottle. However, the perforation may be forced open to serve as a vent, but only in the event that sufficient pressure develops to distend the central portion of the diaphragm through aperture 16, forming a pronounced bubble such as is shown in FIG. 3.

The opening of the perforation is controlled mainly by the lateral distention of the resilient material, which in turn is controlled by the size of the bubble. That is, the relatively large bubble is sensitive to increases in pressure and responds by enlarging with every increase of pressure, until the point of internal tension is equalized, opening the perforation.

The diaphragm thus serves a pressure regulating function, maintaining a predetermined level of pressure within the bottle, as opposed to a mere venting function in which it vents excess gas.

The pressure level maintained is that which is the optimum for preparing the pressurized beverage. Maintaining the pressure reproduceably at the optimum level is made possible by the control of several factors. First, the perforation through the diaphragm is made relatively small with respect to the aperture through the cap top, so that a bubble of substantial size must be formed before gas can escape from the bottle. As a practical rule of thumb, these variables should be controlled so that the bubble developed will have a base: height ratio (to the point of highest bubble distension) of at least from 1:1–6:1. In addition, the thickness, resiliency, and inherent character of the diaphragm are controlled as required to produce the desired result.

Although the foregoing variables may be modified within limits, I have found that in making malted beverages, using a bottle fitted with a crown cap, an optimum pressure of 30–40 pounds per square inch at room temperature may be maintained within the bottle over a long period of time if the aperture through the top of the cap is from 1/8 to 3/8 inch in diameter, if the diaphragm is made of natural rubber having a thickness of 1/32–3/32 inch and a durometer value of 50–70, and if the perforation through the diaphragm is made by a spike-shaped instrument having a diameter of from 0.010 to 0.100.

It is to be observed that in view of the resiliency of the diaphragm material and the smallness of the perforation it is impossible to measure the exact size of the perforation. This is true particularly since the gasket distends when it is punctured and since the puncture is closed tightly after the operation. Hence the only practical measure of the opening size is the size of the puncturing instrument.

More specifically, in a highly satisfactory bottle cap for use in making malted beverages where the pressure is to be regulated within the above indicated range of 30–40 pounds per square inch at room temperature, the aperture through the bottle cap may be 1/4 inch in diameter and round; the diaphragm of natural rubber 1/16 inch thick and having a durometer value of 50; and the opening through the diaphragm made with a sharp instrument having a diameter of 0.037 inch.

Figure 4:
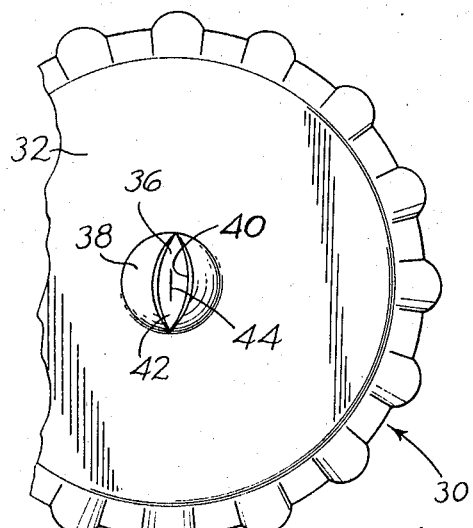
FIG. 4 is a plan view and FIG. 5 is a view in side elevation, partly in section, of the bottle cap of the invention in a second of its embodiments.
Figure 5:
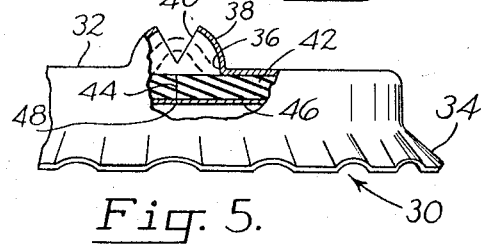

The form of the invention illustrated in FIGS. 4 and 5 is similar to that described above with the exception that means are provided for protecting the diaphragm from the action of the bottled liquid, or conversely protecting the liquid from any ill-tasting or harmful ingredient which might be contained in the diaphragm. Also, means are provided for shielding the aperture in the cap so that it can not be blocked, as by stacking the bottles for storage during fermentation.

In this form of the invention a crown cap indicated generally at 30 is formed with a top 32 and a fluted skirt 34. An aperture 36 extends through the central portion of the top. It is defined by a dome-shaped shield member 38 which preferably comprises an outwardly deformed portion of the cap material. A slit 40 is present at the top of the dome to permit the escape of gas.

A diaphragm 42 is seated inside the cap. It is similar in construction and function to diaphragm 20 of the previously described form of the invention, being made of rubber or neoprene, and having a central perforation 44 communicating with aperture 36 in the top of the cap.

The underside of diaphragm 42 has a protective polyethylene coating 46 which may be united adherently to the diaphragm, or which may be present as a separate member. A perforation 48 through the coating registers with perforation 44 through the diaphragm, permitting the escape of gas from the bottle. In this manner the beverage in the bottle and the diaphragm undersurface are insulated from each other.

Figure 6:
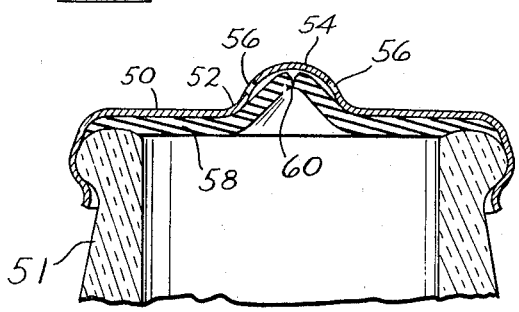
FIG. 6 is a sectional view illustrating the presently described bottle cap in another of its embodiments.

The form of the invention illustrated in FIG. 6 includes an alternate form of shield for the aperture through the top. In this form of the invention a crown cap 50 is crimped on bottle 51. The cap has a central aperture 52 defined by an outwardly projecting shield 54. As above described, this may be formed by displacing a portion of the cap material outwardly. Two slits 56 are cut through the shield, one on each side, to allow the escape of gas. As before, a resilient diaphragm 58 is seated in the cap and is provided with a central perforation 60 which serves as a vent.

It is to be noted that both shield 38 of FIGS. 4 and 5 and shield 54 of FIG. 6, in addition to serving an aperture-protecting function, also serve as a backing for the bubble formed during distention of the diaphragm. This provides still another manner of controlling the size of the vent opening through the diaphragm since the opening size is commensurate with the degree of distention of the diaphragm. The dimensions and relative proportions of the shields accordingly may be used to determine the extent of the bubble and the size of the vent opening through the diaphragm is controlled correspondingly.

Figure 7:
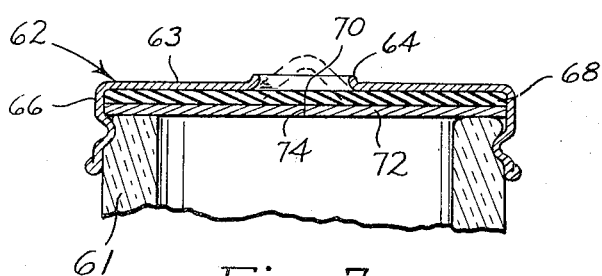
FIG. 7 is a sectional view illustrating the bottle cap in still another one of its embodiments.

FIG. 7 illustrates a form of the invention which may be employed in bottling fruit juices which are to be preserved for a while and then fermented.

Such juices may be vacuum packed in a screw neck bottle 61 provided with a screw cap 62. The top 63 of the cap has a central aperture 64. A threaded skirt 66 depends from the cap for attaching it to the bottle.

Cap 62 seats a rubber diaphragm 68 corresponding in construction and function to the rubber diaphragms employed in the previously described forms of the invention. It has a central perforation 70.

Also seated in cap 62, however, underneath diaphragm 68, is a stiff backing element or gasket 72. This may be made of sheet polyethylene about 0.025 inch thick, or of other strong, waterproof material. Originally it may be entire or perforated. If entire, it later is discarded. If perforated, its central portion has a perforation 74 which registers with perforation 70 in diaphragm 68.

When using the cap of FIG. 7 for the processing of fruit juices, the juices may be vacuum packed in bottle 61 and screw cap 62 applied with diaphragm 68 and backing disc 72 in place.

The bottle remains thus vacuum packed with its contents preserved until it is desired to ferment it. Thereupon the cap is removed; backing disc 72 removed, if entire; a suitable fermenting agent introduced into the bottle; and the cap replaced.

As the fermentation continues and gas pressure develops, the diaphragm distends through aperture 64 and serves the pressure regulating function above described.

In this application backing disc 72 serves two important functions. First, it helps preserve the vacuum in the bottle during the storage period by providing a seal against the bottle top and against diaphragm 68. Secondly, it preserves the inherent shape and resiliency of diaphragm 68 during the storage period, so that it can exert properly its pressure-regulating function during the fermentation period.

It accordingly will be seen that there is provided an apparatus in which the several objects of this invention are achieved and which is well adapted to meet the conditions of practical use.

It is to be understood that the form of my invention herein shown and described is to be taken as a preferred example of the same, and that various changes in the shape, size and arrangement of parts may be resorted to without departing from the spirit of my invention and the scope of the subjoined claim.

Having thus described my invention, I claim:

A pressure regulating bottle cap comprising (a) a top having a central aperture therethrough of from 1/8 to 3/8 inch diameter, (b) means for securing the top to the bottle, and (c) a resilient diaphragm seated in the cap in sealing relation against the inner surface of the top, the diaphragm being made of rubber having a durometer value of 50–70 and having a thickness of from 1/32 to 3/32 inch, (d) the diaphragm having a central perforation communicating with the aperture, the perforation having a diameter equal to that produced by puncturing of the diaphragm with a sharp instrument having a diameter of 0.010 to 0.100 inch, (e) the central portion of the diaphragm being distendable through the aperture by gas pressure developed in the bottle to form a bubble projecting outwardly from the cap, (f) the aperture and perforation being so proportioned relative to each other that the perforation is substantially closed to the passage of gas until the gas pressure has developed sufficiently to project the bubble through the aperture and overcome the resiliency of the diaphragm material in the area of the perforation, (g) thereby opening the perforation and periodically venting excess gas to the atmosphere while retaining a predetermined level of gas pressure in the bottle.

References Cited by the Examiner

UNITED STATES PATENTS

| | | | |
|---|---|---|---|
| 1,692,183 | 11/1928 | Miles | 215—79 X |
| 1,865,764 | 7/1932 | Keenan | 215—56 |
| 2,163,262 | 6/1939 | Rhodes | 220—44 |
| 2,726,002 | 12/1955 | Dalianis | 215—56 X |
| 3,059,800 | 10/1962 | Mills | 215—56 |

FOREIGN PATENTS 806,518  6/1951  Germany.

JOSEPH R. LECLAIR, *Primary Examiner.*

GEORGE O. RALSTON, *Examiner.*

D. F. NORTON, *Assistant Examiner.*